United States Patent
Dinter

(10) Patent No.: US 12,013,002 B2
(45) Date of Patent: Jun. 18, 2024

(54) ROTATIONALLY ELASTIC COUPLING WITH WEAR SENSOR

(71) Applicant: FLENDER GMBH, Bocholt (DE)

(72) Inventor: Ralf Martin Dinter, Gelsenkirchen (DE)

(73) Assignee: Flender GmbH, Bocholt (DE)

( * ) Notice: Subject to any disclaimer, the term of this patent is extended or adjusted under 35 U.S.C. 154(b) by 0 days.

(21) Appl. No.: 18/277,656

(22) PCT Filed: Feb. 2, 2022

(86) PCT No.: PCT/EP2022/052379
§ 371 (c)(1),
(2) Date: Aug. 17, 2023

(87) PCT Pub. No.: WO2022/175078
PCT Pub. Date: Aug. 25, 2022

(65) Prior Publication Data
US 2024/0133432 A1 Apr. 25, 2024

(30) Foreign Application Priority Data
Feb. 17, 2021 (EP) ..................... 21157667

(51) Int. Cl.
*F16D 3/68* (2006.01)
*B33Y 80/00* (2015.01)
*G01N 3/56* (2006.01)

(52) U.S. Cl.
CPC .............. *F16D 3/68* (2013.01); *G01N 3/56* (2013.01); *B33Y 80/00* (2014.12); *F16D 2300/18* (2013.01)

(58) Field of Classification Search
CPC ....... B33Y 80/00; F16D 3/68; F16D 2300/18; G01N 3/56
(Continued)

(56) References Cited

U.S. PATENT DOCUMENTS

| 1,552,892 A | * | 9/1925 | Suppler | ..................... | F16D 3/68 |
| | | | | | 464/74 |
| 2,092,704 A | * | 9/1937 | Ricefield | ................... | F16D 3/68 |
| | | | | | 464/76 |

(Continued)

FOREIGN PATENT DOCUMENTS

| AT | 355380 B | * | 2/1980 | ............... F16D 3/68 |
| DE | 1211872 B | * | 3/1966 | ............... F16D 3/68 |

(Continued)

OTHER PUBLICATIONS

International Search Report for International Application No. PCT/EP2022/052379 dated May 10, 2022 (3 pages).

(Continued)

*Primary Examiner* — Josh Skroupa
(74) *Attorney, Agent, or Firm* — REISING ETHINGTON, P.C.

(57) ABSTRACT

A rotationally elastic coupling has a first coupling part with elastomers. The elastomers are arranged in the first coupling part in such a way that the elastomers serve to transfer a force onto a second coupling part when the first coupling part and the second coupling part are connected to one another. In order to improve the identification of wear, the rotationally elastic coupling has a switching element that is arranged at least in part in a first elastomer of the elastomers. A method is provided for producing a first elastomer for a rotationally elastic coupling of this kind. A method is provided for identifying a wear state for a rotationally elastic coupling of this kind.

16 Claims, 3 Drawing Sheets

(58) Field of Classification Search
USPC .................................. 464/23, 76; 340/679
See application file for complete search history.

(56) References Cited

U.S. PATENT DOCUMENTS 5,701,119 A    12/1997  Jurras, III
8,347,751 B2 *  1/2013  Haussecker ............ F16H 55/14
                                                        74/411

FOREIGN PATENT DOCUMENTS

| DE | 1267480 B   * | 5/1968  | ............ F16D 3/68 |
| DE | 1450191 A1  * | 3/1969  | ............ F16D 3/68 |
| DE | 2115506 A1    | 10/1972 |                        |
| DE | 2618340 A1  * | 11/1977 | ............ F16D 3/68 |
| DE | 102006053282 A1 | 5/2008 |                       |
| DE | 102007063519 A1 | 8/2009 |                       |
| EP | 1617095 A1  * | 1/2006  | ............ F16D 3/68 |
| FR | 2833321 B1    | 5/2006  |                        |
| GB | 575163 A    * | 2/1946  | ............ F16D 3/68 |
| JP | S5861331 A    | 4/1983  |                        |
| JP | S6154402 A    | 3/1986  |                        |
| JP | 2009190519 A  | 8/2009  |                        |
| KR | 20030049597 A | 6/2003  |                        |
| SU | 554431 A1   * | 4/1977  | ............ F16D 3/68 |
| SU | 591637 A1   * | 2/1978  | ............ F16D 3/68 |
| WO | WO-2012031733 A1 * | 3/2012 | ......... F16D 3/68 |

OTHER PUBLICATIONS

English Translation of International Search Report for International Application No. PCT/EP2022/052379 dated May 10, 2022 (2 pages).

Written Opinion for International Application No. PCT/EP2022/052379 dated May 10, 2022 (4 pages).

* cited by examiner

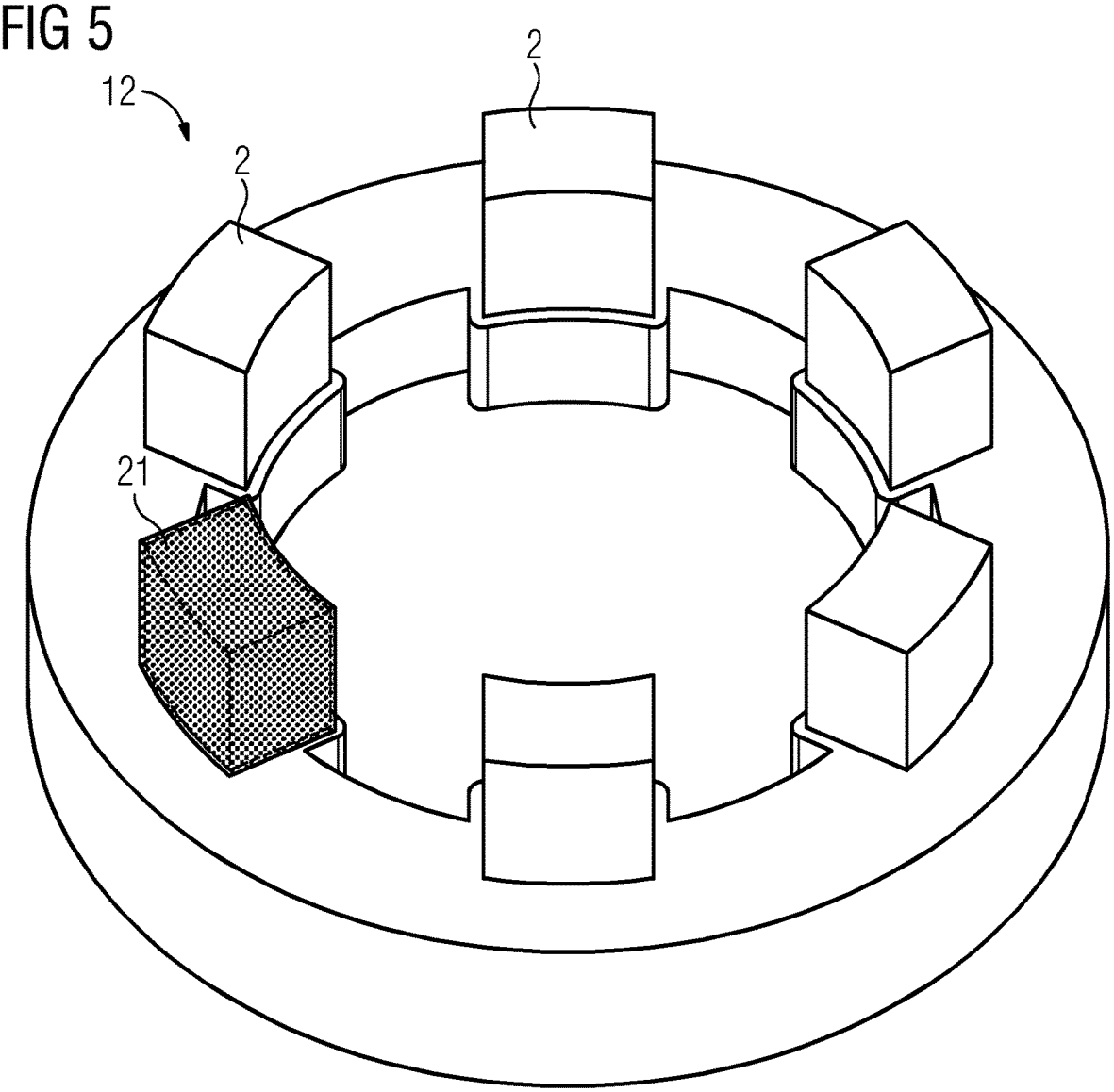

ROTATIONALLY ELASTIC COUPLING WITH WEAR SENSOR

INTRODUCTION

The disclosure, per at least some embodiments, relates to a rotationally elastic coupling, wherein the rotationally elastic coupling includes a first coupling part having elastomers, wherein the elastomers are arranged in the first coupling part in such a way that a force is transferable by the elastomers to a second coupling part when the first coupling part and the second coupling part are connected to one another. Furthermore, the disclosure, per at least some embodiments, relates to a method for producing a first elastomer for such a rotationally elastic coupling. The disclosure, per at least some embodiments, furthermore relates to a method for detecting a wear state for such a rotationally elastic coupling.

Rotationally elastic couplings use elastomers for damping the torques and compensating for offsets of the connected axes of rotation. These couplings are also designated as N-EUPEX couplings or RUPEX couplings. The elastomers used therein are subject to wear. To detect this, an optical inspection can be performed at a standstill. Alternatively, the wear can be detected with the aid of a stroboscope sensor in operation.

A rotationally elastic coupling having two coupling parts connected to one another via an elastomer component is known from DE 10 2007 063 519 A1 wherein a circuit is led through the elastomer component, which is impaired upon correspondingly strong wear of the elastomer component and the impairment of which can be detected in a contactless manner or by means of slip rings from a stationary measuring probe provided outside the coupling.

SUMMARY

The disclosure, per at least some embodiments, is based on the object of improving the wear detection in a rotationally elastic coupling.

The object, per at least some embodiments, is achieved by a rotationally elastic coupling having the features of claim 1, a method having the features of claim 9, and a method having the features of claim 13. Preferred embodiments are set forth in the dependent claims and the following description, which may individually or in combination represent an aspect of the disclosure. If a feature is described in combination with another feature, this is used only for simplified description of the invention and is in no way to mean that this feature cannot also be a refinement of the disclosure without the other feature.

One aspect of the disclosure, per at least some embodiments, relates to a rotationally elastic coupling, which includes a first coupling part having elastomers, wherein the elastomers are arranged in the first coupling part in such a way that a force is transferable to a second coupling part by the elastomers when the first coupling part and the second coupling part are connected to one another, and a switching element arranged in a first elastomer is provided, wherein the switching element is electrically connected to an actively operated transmitter, wherein the transmitter is arranged, in particular embedded and/or enclosed, at least partially in the first elastomer of the elastomers.

A further aspect of the disclosure, per at least some embodiments, relates to a method for producing a rotationally elastic coupling according to the disclosure, per at least some embodiments, in which a first elastomer for the rotationally elastic coupling is printed by means of 3D printing.

A further aspect of the disclosure, per at least some embodiments, relates to a method for detecting a wear state for a rotationally elastic coupling, wherein a wear limit is detected by a switching action of the switching element induced by a wear of the elastomer.

The disclosure, per at least some embodiments, is based, among other things, on the finding that the wear detection may be improved if the switching element and the transmitter are at least partially integrated in the elastomer. The elastomers can advantageously, but not necessarily, be arranged circularly on the first coupling part here. The elastomers are loaded nearly equally during the transfer of the torque in the coupling. In addition, it is advantageous to arrange the elastomers equidistantly to one another on the circular path, in order to also thus allocate the load uniformly on the corresponding coupling parts and the individual elastomers. The switching element can be designed here in such a way that it both opens upon reaching a wear limit and closes upon reaching the wear limit. It is thus possible to produce both active and passive monitoring of the wear. To transmit the information about a detected wear limit out of the rotating coupling, the use of a transmitter designed as a radio transmitter has proven to be advantageous, per at least some embodiments. This transmitter can be arranged in the first elastomer, in particular embedded and/or enclosed, and can preferably interact with a receiver arranged at another point in the coupling or outside the coupling. The transmitter can in this case emit electromagnetic waves in a frequency range provided for radio signals. Alternatively or additionally, it is also possible to optically display reaching the wear limit by way of the transmitter. For this purpose, for example, a light source such as a lamp or LED can be attached to the coupling, preferably on the outside, and can light up or flash, for example, when the wear limit is reached. The transmitter can emit visible light in this case. Alternatively, it is also possible that the color of the light source changes upon reaching the wear limit, in particular suddenly. Moreover, the transmitter can be designed as a loudspeaker to be able to acoustically indicate reaching the wear limit. In this case, the transmitter can emit audible sound waves.

In particular, the switching element is designed to output a binary signal on the wear state of the elastomers, wherein the transmitter is designed as switchable in reaction to the binary signal. A binary signal is understood as a signal having precisely two signal values, which are assigned to precisely two switching states, for example "1" and "0" or "on" and "off" or "wear limit not reached" and "wear limit reached". These precisely two switching states can easily be depicted via a conductor loop connected to a battery-operated transmitter as a switching element, in which the states "conductor loop closed" and "conductor loop open" correspond to the precisely two switching states for the binary signal of the switching element. When the conductor loop is severed and/or broken through upon excess wear, this can result in switching on of the connected transmitter, in particular a radio transmitter, light element, and/or loudspeaker, to communicate the excess wear. The information thus transmitted, in particular digital information or a digital signal, can be detected by service personnel or recorded by a receiving unit and can give the service personnel a corresponding notification about required maintenance work or a replacement of the rotationally elastic coupling.

The transmitter is in particular connected to a battery as the power supply and/or energy source, wherein in particular the transmitter and the battery are embedded in the first elastomer. Due to the battery as a power supply, the transmitter can be actively operated and/or the switching state of the switching element can be read out actively and/or passively, so that a measurement technology provided outside the coupling for detecting the switching state of the switching element and/or a touch-involved or touchless communication to an evaluation unit is avoided. Instead, it is possible that the switching element and the transmitter actively operated using the battery are embedded as an autonomous unit within the first elastomer and in particular only the signal emitted by the transmitter leaves the first elastomer. An active signal path from outside the first elastomer to the switching element and/or to the transmitter in order to read out the switching state can be saved. Instead, a passive element can be provided outside the coupling, which is first activated by the signal emitted by the transmitter, for example is woken from a sleep mode. The active element can initiate automated measures which are provided for the case of the detection of excess wear of the elastomers.

The switching element is advantageously arranged, per at least some embodiments, at least partially in the first elastomer of the elastomers in such a way that before reaching a wear limit, the parts of the switching element arranged in the elastomer are located completely in the interior of the elastomer and upon reaching the wear limit, a portion of the part of the switching elements arranged in the elastomer appears at a surface of the elastomer. This wear can result, for example, due to abrasion of the elastomer. If the elastomer gets cracks, the switching element would also respond and detect this wear.

The feature that the first coupling part and the second coupling part are connected to one another describes the state that a torque can be transferred between the two coupling parts.

The implementation of the switching element at least in parts in the elastomer can be carried out particularly advantageously, per at least some embodiments, by means of 3D printing, for example by using TPU (elastomer). With 3D printing, the shaping of the elastomer is flexible in such a way that the switching element or parts of the switching element can be introduced in diverse ways into the elastomer permanently and above all permanently fixed in place in relation to the elastomer.

In one embodiment, the elastomers are arranged, in particular circularly, in the first coupling part in such a way that an intermediate space forms between the elastomers in each case, wherein the second coupling part of the rotationally elastic coupling includes cams, wherein the cams engage in the intermediate spaces when the first coupling part and the second coupling part are connected to one another. A structure having the first and the second coupling part can thus be implemented in a simple manner, in which the elastomers are arranged in the first coupling part in such a way that a force is transferable to a second coupling part by the elastomers when the first coupling part and the second coupling part are connected to one another. Wear detection may be particularly important for this arrangement, per at least some embodiments, since otherwise the coupling can have excessive play, which impermissibly influences the function of the drive. In other words, play in the arrangement can be avoided by the proposed wear detection in a simple manner and a reliable drive can be provided. This type of coupling is usable in a particularly diverse manner and can also be monitored easily using the proposed arrangement with respect to the wear and thus for secure and reliable operation.

It is preferably provided, per at least some embodiments, that the transmitter is provided in a first partial body of the first elastomer and the power supply is provided in a second partial body of the first elastomer, spaced apart via the intermediate space from the first partial body, wherein the first partial body and the second partial body are connected to one another via an elastomer web of the first elastomer and the transmitter and the power supply are electrically connected to one another via lines embedded in the elastomer web. In particular, the switching element is provided in the first partial body and/or in the second partial body, which in particular can be electrically connected to the adjacent transmitter or power supply provided in the same partial body. This enables the electrically connected components different from the switching element, such as transmitter, power supply, and/or an evaluation unit, to be distributed in various partial bodies spaced apart from one another via the intermediate space. The components can thus easily be positioned far enough into the interior of the partial body, where damage due to wear is reliably avoided. Instead, it can be ensured that upon wear first a change in the switching state of the switching element has to occur before an impairment of the other electrically connected components can occur at all. A high functional reliability for the wear monitoring of the elastomers can thus be achieved with a small installation space requirement.

In a further embodiment, the transmitter includes a radio transmitter, wherein a signal about the wear state of the rotationally elastic coupling is transferable by means of the radio transmitter. A radio transmitter is a cost-effective component, using which the information about the wear can be transferred contactlessly from the interior of the rotationally elastic coupling, in particular from the interior of the elastomer, to a receiver arranged outside the coupling. The receiver can be, for example, a part of a condition monitoring system, which detects the state of the system, the drive, or the coupling and/or detects and/or plans maintenance measures. The power supply can be implemented in a simple manner by an energy storage device. Depending on the power demand, which is less with passive monitoring than with active monitoring, the energy storage device can be implemented by a battery, an accumulator, or a capacitor, in particular a double layer capacitor.

In a further embodiment, the transmitter includes a light source, wherein a signal about the wear state of the rotationally elastic coupling is transferable by means of the light source. A light source is a particularly simple option for indicating a wear state and in particular reaching a wear limit. Complex measures, as are presently typical, for example disassembling the coupling or using a stroboscope sensor, can be omitted. Moreover, the use of a light source is particularly simple and the application requires only little electrical energy, thus is particularly energy-saving. The state of reaching the wear limit can be detected in a simple manner in operation of the coupling, i.e., during the rotation of the coupling.

In a further embodiment, the switching element is arranged completely in the first elastomer. In this embodiment, the switching element can be formed easily by wire loops in the interior of the elastomer. Abrasion or cracks result at the surface of the elastomer due to wear. Upon reaching the wear limit, at least a section of the wire loops appears at the surface of the first elastomer. The wire loop is interrupted by further wear, now also on at least parts of the wire loop. This interruption, thus the open circuit, can be detected. It has proven to be advantageous here, per at least some embodiments, to carry out the monitoring for interruption cyclically, in particular at an interval of hours, to keep the energy consumption low. A monitoring device which executes the monitoring is put into a sleep mode between the cyclically occurring monitoring passes, in order to strain the power supply as little as possible and keep the energy consumption low. The power supply can thus be implemented small, for example in the form of a battery or a capacitor, in particular a double layer capacitor. Since monitoring with energy consumption normally also takes place in the wear-free state, this monitoring is also designated as active monitoring. One possible advantage of this monitoring is that the state of the wear limit not yet being reached is actively detected in the cyclic time intervals. In contrast, the transmitter only has to be activated upon detecting the wear limit. In the context of component monitoring of the coupling, such as condition monitoring, it has proven to be advantageous to also transmit the information about the wear limit not being pre-sent by means of the radio transmitter.

In a further embodiment, at least one first cam of the cams is arranged adjacent to the first elastomer when the first coupling part and the second coupling part are connected to one another, wherein at least one surface of the first cam is made electrically conductive, wherein two contacts of the switching element arranged in the first elastomer are arranged in the first elastomer in such a way that upon the presence of a defined wear state, the contacts are electrically conductively connected to one another by means of the first cam. In this embodiment, the wire loop is part of the switching element. It is sufficient if the surface of the first cam is made conductive. This cam connects two contacts in the elastomer to the monitoring device. As soon as the elastomer reaches the wear limit, the contacts are at the surface of the elastomer. These two contacts are electrically conductively connected to one another by the conductive abutting cams and the monitoring device thus detects the short circuit. This state can also advantageously be, per at least some embodiments, transmitted using a radio transmitter to a receiving unit in this embodiment. In this embodiment, the wear limit is detected by a short circuit. This can have the advantage that due to the open circuit in operation, thus before reaching the wear limit, no current flow takes place and thus no energy consumption occurs for the monitoring. This monitoring is also designated as passive monitoring, since in operation, thus before reaching the wear limit, no current flow or energy consumption takes place. This elastomer can also be produced in a simple manner with the above-mentioned advantages in the 3D printing method.

The monitoring device can be arranged in the elastomer at the same time. In this case, the conductive cam is used to connect the contacts, thus to short circuit them. Alternatively, it is possible to arrange the monitoring device in the rotationally elastic coupling outside the elastomer. In this case, the conductive cam also includes a conductive surface.

The first cam includes two conductive surface parts insulated from one another, wherein the surface parts are each conductive. A short circuit is generated between the two surface parts upon reaching the wear limit by the contact with the wire loop in the elastomer, in particular via the contacts arranged in the elastomer. This short circuit can be detected by the monitoring device, which is arranged outside the elastomer and is connected to the surface parts of the first cam. The wear limit is reliably detected by detecting the short circuit. Both of these alternatives represent passive monitoring, in which no or at least very little electrical energy is consumed by the monitoring before reaching the wear limit. An energy supply, for example in the form of an energy storage device, can then be dimensioned particularly small.

In a further embodiment, the switching element is introduced into the interior of the first elastomer by means of 3D printing by using an electrically conductive material. The switching element is or the parts of the switching element arranged in the elastomer are also at least partially printed by means of 3D printing in the interior of the elastomer. A secure arrangement of the switching element or the parts of the switching element within the elastomer thus results. The switching element is thus arranged fixed in place and cannot slip. The wear indication is thus also only subject to relatively small tolerances and can reliably detect and report a defined degree of wear. The printing of the switching element arranged in the elastomer or the parts of the switching element arranged in the elastomer takes place in the 3D printing method using an electrically conductive material. The location of the wire loop may thus be arranged precisely with only small tolerances in the elastomer. This results in particularly accurate and reliable wear monitoring. Excessively early detection due to safety factors because of existing tolerances and thus excessively short utilization of the elastomers or, because of this, excessively short maintenance intervals are avoided. Monitoring can be implemented with small tolerances in the detection using the proposed embodiment. Existing maintenance intervals of the rotationally elastic coupling are thus lengthened and optimally utilized.

In a further embodiment, openings and/or cavities for inserting contacts are introduced into the interior of the first elastomer by means of the 3D printing. The openings and/or cavities for inserting contacts into the elastomer can be implemented in 3D printing in such a way that these contacts are then located in the interior of the elastomer. These can be accessible as openings in the finished state of the first elastomer, so that the contacts are then introduced. It is also possible to interrupt the printing process for the insertion of the contacts and continue it after the insertion. The contacts are then located as a cavity in the interior of the elastomer and are no longer externally accessible. They are arranged protected from external influences by the attachment in a cavity of the elastomer. It is also alternatively possible to also print the contacts by means of 3D printing. In addition, due to the flexible shaping of the opening or the cavity, it is possible to fix the contacts at this location in such a way, in particular to clamp them, that they are permanently arranged in the interior of the elastomer, also during the rotation of the coupling, without further fastening means, thus free of fastening means. This can take place, for example, in that the contacts are pressed into the openings. The printing of the contacts also enables the permanent and secure fixing of the contacts in the first elastomer.

In a further embodiment, a further opening and/or a further cavity for inserting the power supply or the transmitter, in particular the radio transmitter, is introduced into the interior of the first elastomer by means of the 3D printing. The introduction of further components, such as the power supply and/or the transmitter, in particular the radio transmitter, can also be carried out using openings and/or cavities, the shaping of which enables these components to also be fixed permanently in the elastomer for the rotating operation. These components can also be pressed or clamped, for example, in the opening. In particular, the opening can be designed in such a way that the centrifugal force during the operation of the coupling fixes the power supply and/or the radio transmitter in the interior of the elastomer. The cavity having the power supply and/or the transmitter can also be formed in this embodiment in such a way that the 3D printing is interrupted to insert these components. With the continuation of the 3D printing, the cavity is closed and the power supply and the transmitter are securely arranged in the first elastomer.

In particular, the wear state is transmitted by radio signals and/or visible light and/or audible sound.

BRIEF DESCRIPTION OF THE FIGURES

The subject matter of the disclosure is described and explained in more detail hereinafter on the basis of the exemplary embodiments illustrated in the figures. In the figures:

FIG. 5 shows an exemplary embodiment of a second coupling part.

DETAILED DESCRIPTION

Figure 1:
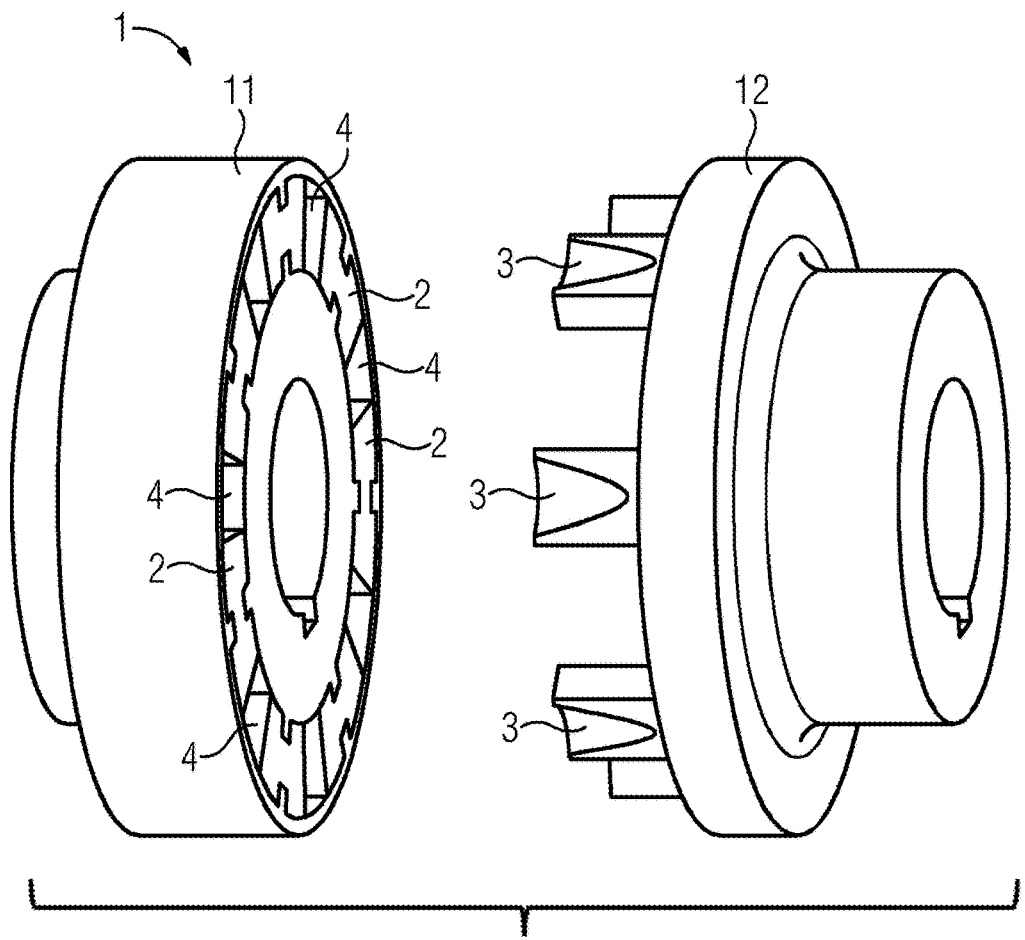
FIG. 1 shows a rotationally elastic coupling.

FIG. 1 shows a rotationally elastic coupling 1. This includes a first coupling part 11 and a second coupling part 12. The rotationally elastic coupling 1 is separated in the illustration and in this state cannot transfer torque between the two coupling parts 11, 12. The first coupling part 11 includes elastomers 2, which are, for example, arranged circularly in the first coupling part 11. Intermediate spaces 4 result between the elastomers.

The second coupling part 12 includes cams 3. In the connected state of the rotationally elastic coupling 1, these cams 3 engage in the intermediate spaces 4 of the first coupling part 11. In the connected state, the rotationally elastic coupling 1 can then transfer a torque between the two coupling parts 11, 12.

The elastomers 2 are subject to wear, which can be monitored by the proposed arrangement, which is described in more detail in the following figures.

Figure 2:
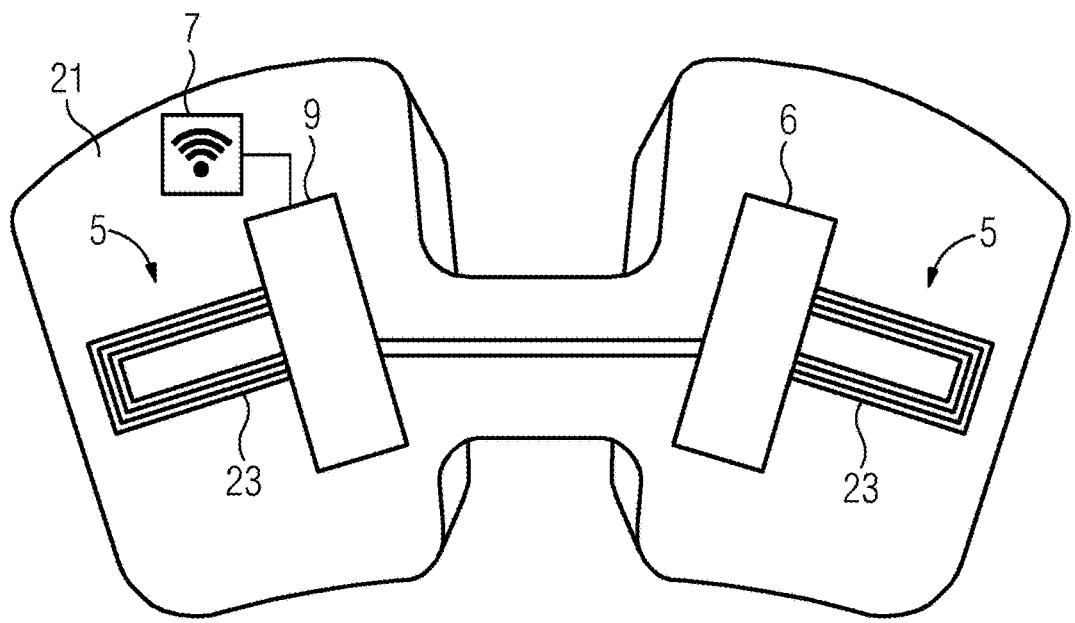
FIG. 2 to FIG. 4 show exemplary embodiments of a first elastomer.

FIG. 2 shows a first exemplary embodiment of a first elastomer 21 of the elastomers 2, in which a corresponding wear monitor is arranged. To avoid repetitions, reference is made to the description of FIG. 1 and to the reference signs introduced therein. This first elastomer 21 includes a switching element 5, which can be formed, for example, by a wire loop 23. This wire loop 23 is connected to a monitoring device 9. The monitoring device 9 monitors the wear. For this purpose, the monitoring device 9 is connected to a power supply 6. Via this connection, the monitoring device 9 acquires electrical energy from the power supply 6, which is provided, for example, by an energy storage device such as a battery, an accumulator, or a capacitor, in particular a double layer capacitor. If the monitoring device 9 detects a wear limit, it can transfer this information by means of a radio transmitter 7.

Alternatively or additionally, it is also possible to report reaching the wear limit via a light source (not shown in this figure). The radio signal is then received and evaluated by a receiver (not shown here) outside the rotationally elastic coupling 1. Due to the operation of the rotationally elastic coupling 1, wear occurs at the elastomers 2 and thus also at the first elastomer 21. Due to the wear of the surface or the formation of cracks at the surface of the first elastomer 21, the wire loop 23 appears at this surface. The wire loop 23 is interrupted by further wear. The monitoring device 9 connected to the wire loop 23 now detects the open circuit and concludes the presence of the wear limit therefrom. This monitoring or the corresponding monitoring method has the advantage, per at least some embodiments, that this monitoring or this method reliably detects the wear of the elastomer 2 even at a standstill of the coupling 1 and reports when the cams 3 do not abut the first elastomer 21. The monitoring device 9 can communicate this state by means of the radio transmitter 7 or by means of the light source (not shown here).

Figure 3:
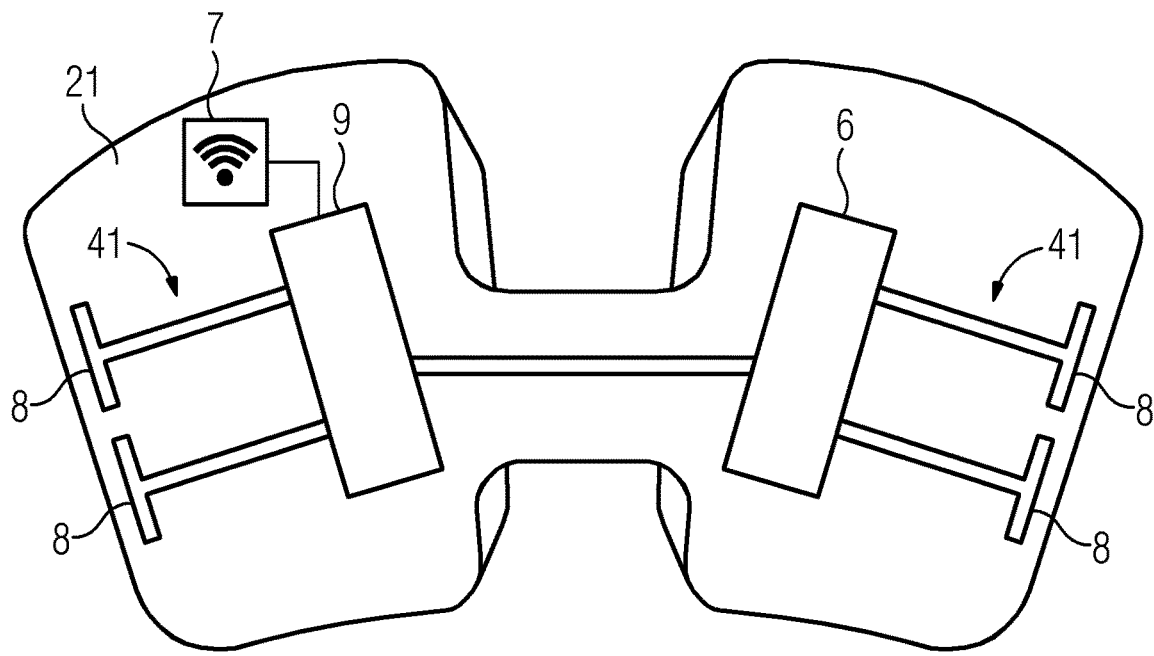

FIG. 3 shows a further exemplary embodiment of a first elastomer 21. To avoid repetitions, reference is made to the description of FIGS. 1 and 2 and to the reference signs introduced there. Instead of the switching element 5 of FIG. 2, in this exemplary embodiment only parts 41 of the switching element 5 are arranged in the interior of the first elastomer 21. These include contacts 8, which are connected to the monitoring device 9. These also appear, as already described above, at the surface of the first elastomer 21 upon reaching the wear limit. The two contacts 8 are electrically conductively connected to one another in this case by a first cam 31 of the cams 3 of the second coupling part 12. This short circuit by the switching element 5, which is formed by the part 41 of the switching element 5 and the first cam 31, is detected by the monitoring device 9, which can then trans-fer this state by means of the radio transmitter 7 or the light source.

Figure 4:
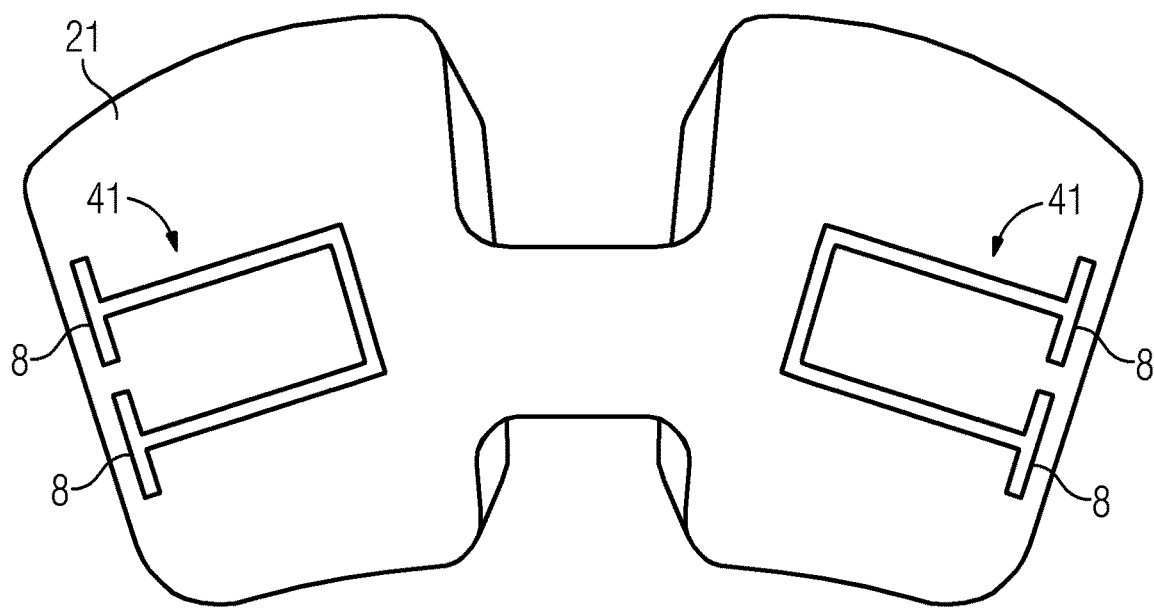

FIG. 4 shows a further exemplary embodiment of a first elastomer 21. To avoid repetitions, reference is made to the description of FIGS. 1 to 3 and to the reference signs introduced there. The monitoring device 9 and the radio transmitter 7 are arranged outside the first elastomer 21. In this way, no power supply 6 is also required in the first elastomer 21. Due to reaching the wear limit, the contacts 8 again appear at the surface of the first elastomer 21 and thus in contact with the first cam 31. The first cam 31 again includes a conductive surface. The surface is divided here into at least two conductive surface parts, which are electrically insulated from one another. However, these two surface parts are electrically connected to one another via the contacts 8 and a short circuit results between the surface parts. The monitoring device 9 detects this short circuit, which can then transfer this state by means of the radio transmitter 7.

The arrangement of the monitoring device 9 and/or the radio transmitter 7 can also take place outside the first elastomer 21 in the embodiment according to FIG. 2.

FIG. 5 shows an exemplary embodiment of the second coupling part 12. To avoid repetitions, reference is made to the description of the preceding figures, and to the reference signs introduced there. This second coupling part 12 includes cams 3, which engage in the intermediate spaces 4 of the first coupling part 11 in the connected state of the rotationally elastic coupling 1. In this illustration, in addition to the cams 3, a first cam 31 can be seen, the surface of which is coated using a conductive material, in order to electrically connect contacts 8 of the first elastomer 21 or to detect a short circuit across the contacts 8. It is also alternatively possible that the first cam 31 includes a conductive material or even consists of a conductive material.

In summary, at least some embodiments relate to a rotationally elastic coupling, wherein the rotationally elastic coupling includes a first coupling part having elastomers, wherein the elastomers are arranged in the first coupling part in such a way that a force is transferable to a second coupling part by the elastomers when the first coupling part and the second coupling part are connected to one another. To improve the wear detection, it is proposed that the rotationally elastic coupling include a switching element, wherein the switching element is arranged at least partially in a first elastomer of the elastomers. Furthermore, at least some embodiments relate to a method for producing a first elastomer for such a rotationally elastic coupling, wherein the first elastomer is printed by means of 3D printing. At least some embodiments relate to a method for detecting a wear state for such a rotationally elastic coupling, wherein a wear limit is detected by a switching action of the switching element.

As used herein, the terms "general," "generally," and "approximately" are intended to account for the inherent degree of variance and imprecision that is often attributed to, and often accompanies, any design and manufacturing process, including engineering tolerances, and without deviation from the relevant functionality and intended outcome, such that mathematical precision and exactitude is not implied and, in some instances, is not possible.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention.

The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A rotationally elastic coupling, which comprises a first coupling part having elastomers, wherein the elastomers are arranged in the first coupling part in such a way that a force is transferable to a second coupling part by the elastomers when the first coupling part and the second coupling part are connected to one another, and a switching element arranged in a first elastomer is provided,
wherein
the switching element is electrically connected to an actively operated transmitter, wherein the transmitter is at least partially arranged in the first elastomer of the elastomers.

2. The rotationally elastic coupling as claimed in claim 1, wherein the switching element is designed to output a binary signal on the wear state of the elastomers, wherein the transmitter is designed as switchable in reaction to the binary signal.

3. The rotationally elastic coupling as claimed in claim 1, wherein the elastomers are arranged in such a way in the first coupling part that an intermediate space forms in each case between the elastomers, wherein the second coupling part of the rotationally elastic coupling includes cams, wherein the cams engage in the intermediate spaces when the first coupling part and the second coupling part are connected to one another.

4. The rotationally elastic coupling as claimed in claim 3, wherein at least one first cam of the cams is arranged adjacent to the first elastomer when the first coupling part and the second coupling part are connected to one another, wherein at least one surface of the first cam is made electrically conductive, wherein two contacts of the switching element arranged in the first elastomer are arranged in the first elastomer in such a way that upon the presence of a defined wear state, the contacts are electrically conductively connected to one another via the first cam.

5. The rotationally elastic coupling as claimed in claim 3, wherein the elastomers are arranged circularly.

6. The rotationally elastic coupling as claimed in claim 1, wherein the transmitter is connected to a battery as a power supply, wherein the transmitter and the battery are embedded in the first elastomer.

7. The rotationally elastic coupling as claimed in claim 6, wherein the transmitter is provided in a first partial body of the first elastomer and the power supply is provided in a second partial body, spaced apart via the intermediate space from the first partial body, of the first elastomer, wherein the first partial body and the second partial body are connected to one another via an elastomer web of the first elastomer and the transmitter and the power supply are electrically connected to one another via lines embedded in the elastomer web.

8. The rotationally elastic coupling as claimed in claim 1, wherein the transmitter includes a radio transmitter, wherein a signal about the wear state of the rotationally elastic coupling is transferable via the radio transmitter.

9. The rotationally elastic coupling as claimed in claim 1, wherein the transmitter includes a light source, wherein a signal about the wear state of the rotationally elastic coupling is transferable via the light source.

10. The rotationally elastic coupling as claimed in claim 1, wherein the switching element, the transmitter, or both the switching element and transmitter is arranged completely in the first elastomer.

11. A method for producing a rotationally elastic coupling as claimed in claim 1, in which a first elastomer for the rotationally elastic coupling is printed via 3D printing.

12. The method as claimed in claim 11, wherein the switching element is introduced into the interior of the first elastomer via 3D printing by using an electrically conductive mated al.

13. The method as claimed in claim 11, wherein openings, cavities, or both openings and cavities for inserting contacts are introduced into the interior of the first elastomer via 3D printing.

14. The method as claimed in claim 11, wherein a further opening, a further cavity, or both a further opening and further cavity for inserting the power supply or the transmitter is introduced into the interior of the first elastomer via 3D printing.

15. A method for detecting a wear state for a rotationally elastic coupling as claimed in claim 1, wherein a wear limit is detected by a switching action of the switching element induced by a wear of the elastomer.

16. The method as claimed in claim 15, wherein the wear state is transmitted by radio signals, visible light, audible sound, or a combination thereof.

\* \* \* \* \*